United States Patent [19]
Christensen et al.

[11] Patent Number: 5,133,163
[45] Date of Patent: Jul. 28, 1992

[54] CONDUIT CONTAINING CONSTRUCTION BLOCK

[76] Inventors: Bruce A. Christensen, 2010 Upper Black Rocks, Cool, Calif. 95614; J. E. Christensen, 3015 Deseret Dr., Auburn, Calif. 95603

[21] Appl. No.: 525,987

[22] Filed: May 21, 1990

Related U.S. Application Data

[63] Continuation-in-part of Ser. No. 384,330, Aug. 28, 1989, abandoned, which is a continuation of Ser. No. 97,727, Sep. 17, 1987, abandoned.

[51] Int. Cl.$^5$ .............................................. E02D 27/00
[52] U.S. Cl. ....................................... 52/102; 52/302; 52/220
[58] Field of Search ................... 52/220, 302, 503–505, 52/606, 607, 102, 302; 285/156, 47; 404/3, 45; 137/594, 375; 138/172–177; 264/277, 278

[56] References Cited

U.S. PATENT DOCUMENTS

| | | | |
|---|---|---|---|
| 942,438 | 12/1909 | Caney | 285/156 |
| 1,524,146 | 1/1925 | Murray | 52/607 |
| 2,592,634 | 4/1952 | Wilson | 52/583 |
| 2,706,134 | 4/1955 | Wilson et al. | |
| 2,909,328 | 10/1959 | Babyak | 47/33 |
| 3,402,731 | 9/1968 | Martin | 285/47 |
| 3,683,960 | 8/1972 | Kirsch | 264/277 |
| 4,161,852 | 7/1979 | Schultz | 52/259 |
| 4,523,415 | 6/1985 | Rosen | 52/220 |
| 4,739,800 | 4/1988 | Barstella | 138/103 |

FOREIGN PATENT DOCUMENTS

| | | | |
|---|---|---|---|
| 580160 | 7/1959 | Canada | 285/156 |
| 40244 | 7/1968 | Finland | 285/47 |
| 198758 | 6/1923 | United Kingdom | 404/45 |
| 253782 | 6/1926 | United Kingdom | 404/3 |

Primary Examiner—James L. Ridgill, Jr.
Attorney, Agent, or Firm—Mark C. Jacobs

[57] ABSTRACT

A construction block suitable for the preparation of an assemblage such as lawn edging, patio perimeters (patio containment system) and the like, wherein a plurality of the blocks are rigidly assembled into the desired configuration without the use of mortar. Each construction block is formed as a pre-cast module, preferably of concrete, within which there is a conduit said conduit being formed from an optional elongated imperforate pipe length with at least one double ended female pipe coupling, and if said pipe is present, double ended female couplings are present at the opposite ends thereof. The conduit may extend in one or more directions through the block and terminates flush with the outer walls thereof.

Connection of adjacent blocks one to another to form an assemblage is carried out by connector means comprising the interposition and adhesion of male nipples within adjacent female couplings. A concrete caulk sealant may be applied between any two spaced blocks to retard growth of grass and weeds.

21 Claims, 3 Drawing Sheets

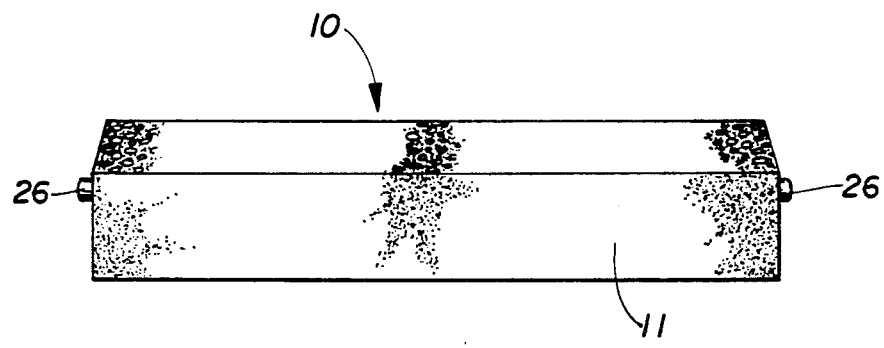
FIG. 1
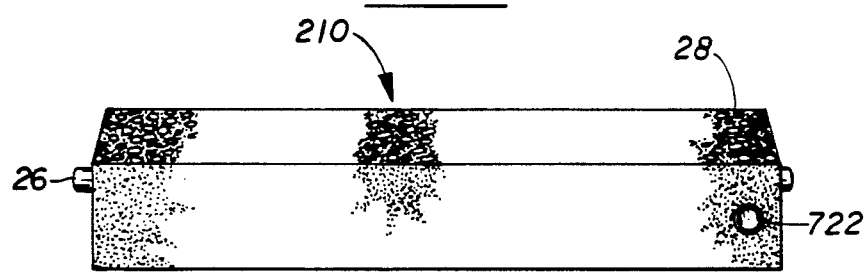
FIG. 2
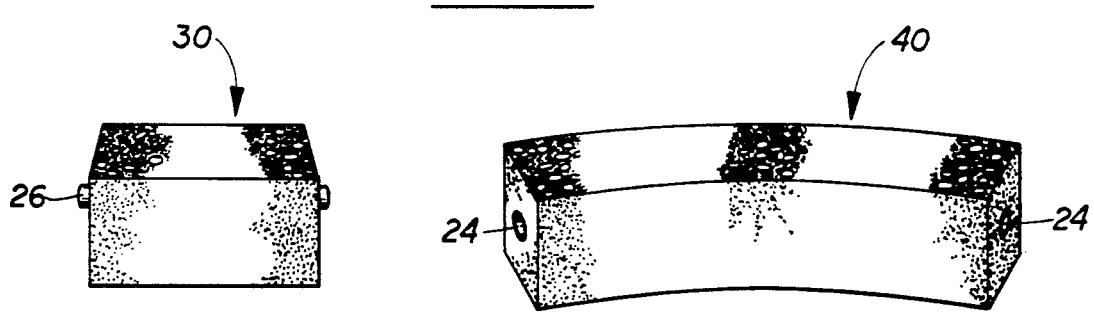
FIG. 3    FIG. 4
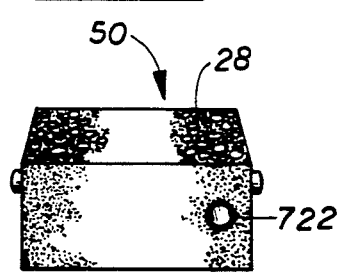
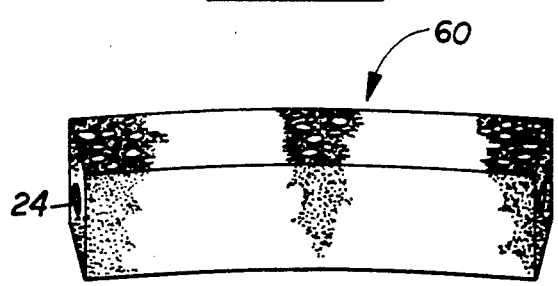
FIG. 5    FIG. 6

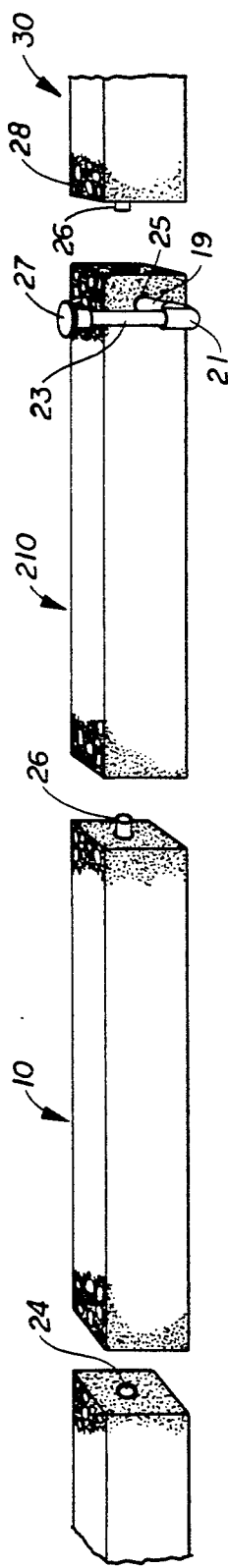
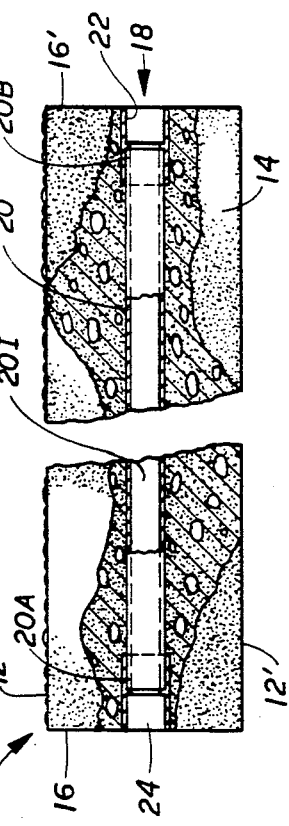
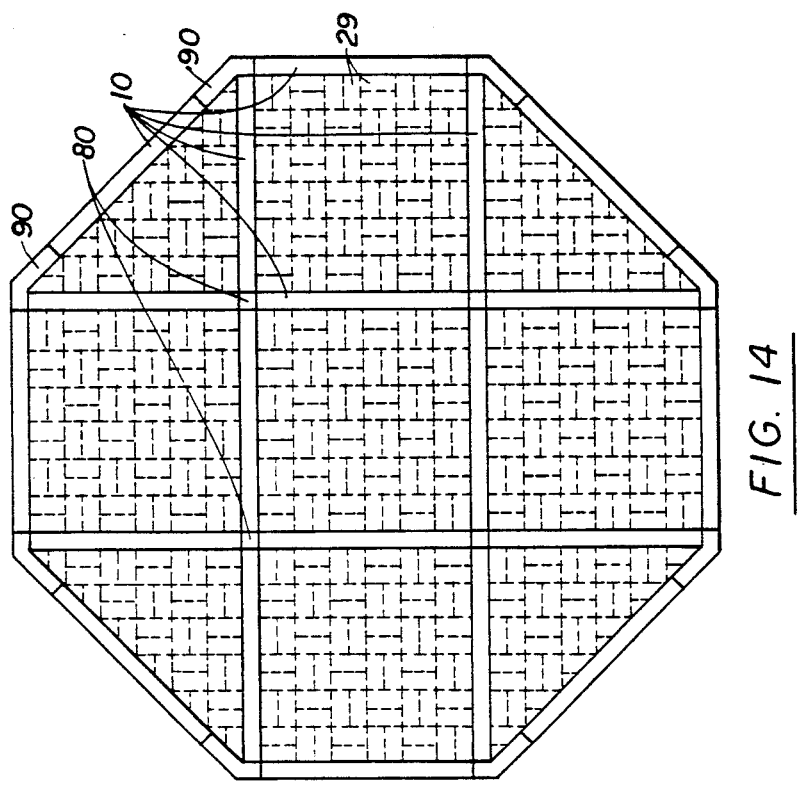
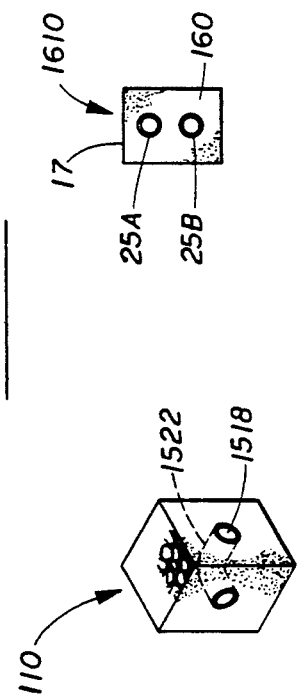
FIG. 12
FIG. 13
FIG. 14
FIG. 15
FIG. 16

CONDUIT CONTAINING CONSTRUCTION BLOCK

RELATION TO OTHER CASES

This application is a continuation-in-part of U.S. Ser. No. 07/384,330, filed Aug. 28, 1989 now . . . , which in turn is a continuation of U.S. Ser. No. 097,727 filed Sep. 17, 1987 and now abandoned.

FIELD OF INVENTION

This invention relates to construction blocks for use in the preparation of mowing strips and for definition of the configuration of patios without the need for mortar.

BACKGROUND OF THE INVENTION

Consumers throughout the country utilize mowing strips of concrete or similar materials to provide a solid surface upon which a lawn mower's wheels may ride, such that the edge of the lawn may be easily mowed. Mowing strips are employed adjacent walls, to separate lawns from flower beds and to isolate trees located within the lawn area.

Since lawn areas, even in times of drought, require water many property owners choose to install a sprinkler system for the grass areas to deliver water thereto.

One common but quite expensive method of providing a mowing strip is one that requires a goodly amount of skill; namely the pouring in place of a monolithic concrete strip. This method discourages most consumers, because it requires trenching a footing, even in warm weather areas, building the forms, which if the assemblage is to have some curves therein may prove difficult, staking the forms in place followed by correct preparation of the concrete, the pouring in place and the finishing of the concrete to be both functional and attractive. This last can in and of itself require a high degree of skill.

In the past, consumers, or sprinkler system designers installed sprinkler systems by trenching the yard, then cutting and gluing pipe into a workable watering system. Then after testing that all joints are secure, the land is backfilled and replanted.

There is a need therefore for the provision of a mowing strip in a freeform configuration, that is easy to install. There is especially a need for a mowing strip system that would integrate the provision of a sprinkler system therein in one step.

Just as there is a need for an easy to install mowing strip, property owners in this day of do it yourself, would love to find a method of defining the perimeter of a patio to be formed from commercial pavers. If at the same time they could provide water for planter boxes on the patio or conduit for delivery of electricity for lightscaping that would be an extra bonus.

Accordingly, it is one object of this invention to provide an easy to install construction block based mowing strip.

It is another object to provide a mowing strip or patio perimeter which incorporates at least one conduit therein.

It is still another object to provide a construction block that can be formed into a fixed assemblage without the use of mortar.

Yet another object is to provide a construction block with separate conduits for a water sprinkler system and for low voltage lighting wiring.

This and other objects of the invention will in part be obvious and will in part appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention reference should be made to the following detailed description taken in conjunction with the accompanying drawings.

KNOWN PRIOR ART

Applicant is aware of the following U.S. Pat. Nos.:

| 4,523,415 | Rosen |
| 4,161,852 | Schultz |

BRIEF DESCRIPTION OF THE FIGURES

FIG. 1 is a top perspective view of a first construction block forming part of this invention.

FIG. 2 is a top perspective view of a second construction block forming part of this invention.

FIG. 3 is a top perspective view of a third construction block forming part of this invention.

FIG. 4 is a top perspective view of a fourth construction block forming part of this invention.

FIG. 5 is a top perspective view of a fifth construction block forming part of this invention.

FIG. 6 is a top perspective view of a sixth construction block forming part of this invention.

FIG. 12 is a front perspective view showing an assemblage during the course of construction in accordance with this invention.

FIG. 13 is a cutaway view of the construction block of FIG. 2.

FIG. 14 is a top plan view of a patio confinement system utilizing the construction blocks of this invention.

FIG. 15 is a top perspective view of a tenth construction block forming part of this invention.

FIG. 16 is an elevational view of a second embodiment of the construction blocks of this invention.

SUMMARY OF THE INVENTION

Figure 7:
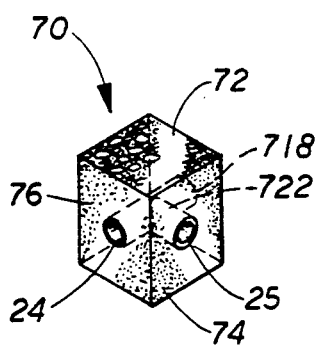
FIG. 7 is a top perspective view of a seventh construction block forming part of this invention.

A construction block for the preparation of an assemblage from a plurality of such blocks, each of which includes a conduit therein, wherein each block is fixedly secured by connector means to at least one adjacent block in a spaced relationship to form the desired configuration, without the use of mortar.

Each construction block is formed as a pre-cast module, preferably of concrete, within which there is a conduit said conduit being formed from an optional elongated imperforate pipe length with at least one double ended female pipe coupling, and if the pipe is present, double ended female couplings are present at the opposite ends thereof. The conduit may extend in one or more directions through the block and terminates flush with the outer walls thereof.

Connection of adjacent blocks one to another to form an assemblage is carried out by connector means comprising the interposition and adhesion of male nipples within adjacent female couplings. A concrete caulk sealant may be applied between any two spaced blocks to retard growth of grass and weeds.

DESCRIPTION OF THE PREFERRED EMBODIMENT

Preface

All of the construction blocks to be discussed hereafter feature the same conduit forming means. While the shape of the individual blocks may differ, the repeating theme is the presence of the internal conduit. This conduit may only provide the connection means from block to block, or in addition it may provide the capability to attach sprinkler risers with sprinkler heads thereon, as will be discussed. In addition, some of the blocks will provide dual conduit means for both low voltage electricity as well as water for a sprinkler system.

The intended use of a block is dependent upon the physical dimensions thereof. Thus we have found that relatively larger ones serve better for defining patio configurations, while the relatively smaller ones are more suitable for lawn edging. However, both sizes to be disclosed may be employed for either purpose.

The discussion now turns to FIGS. 1-6 and to FIG. 13. FIG. 13 is a cutaway view of the block of FIG. 2. Thus block 10 is seen to have a top wall 12, bottom wall 12'; front and rear side walls 14, 14' (not shown) and end walls 16, 16'. (The side walls are designated front and rear based only upon angle of observation in these FIGURES. The front being visible and the rear being unseen.)

A conduit 18 running through the block 10 serves both to reinforce the concrete material 11 from which the block is made and as the mode for making an assemblage of a plurality of the blocks. As can be seen in FIG. 13 conduit 18 includes here an elongated pipe section 20, preferably PVC schedule 40, the ends of which 20A, 20B have been inserted in and adhesively secured to a female coupling 22. The interior of the pipe 20-I, shown in the cutaway of the pipe in FIG. 13, communicates with the openings 24 of each female coupling to permit passage of fluid. Each coupling terminates flush with its respective end wall 16, 16' not shown. Couplings 22 are referred to as double ended female couplings, because each end can receive either a pipe or a nipple. The coupling does just that, it connects two male ended units together to form a longer length.

In further discussion to follow, it will be seen that T-shaped couplings can be employed, such that sprinkler risers can be attached. For the sake of a generic descriptor, these are still referred to as double ended female couplings, because of the fact that the linear aspect of the has a female connection on opposite ends, and it is this linear aspect that constitutes the conduit. As to the embodiment that employs a 90 degree elbow coupling, it still meets the definition, in that the female ends terminate flush with the end walls of the block, the flow just being angular.

Top wall 12 may if desired bear an exposed aggregate finish 28 as is seen in FIG. 2. Such a finish 28 is cosmetic and has no bearing on the structural aspects of the block.

In FIG. a nipple 26 is seen extending from each coupling opening 24. This unit has no exterior outlets for sprinklers and is used at locations in the assemblage where water need not be delivered. Thus it is to be understood, that each coupling terminates flush respective to a block end wall and is open to receive a nipple as described herein.

A nipple 26 is also seen to be in place in the couplings in FIG. 2. However, the coupling at the right end of the FIG. 2 block 210, is seen to be a T, rather than straight hollow member as seen in FIG. 1. Such a tee is seen in FIG. 7 in dashed line and as such is designated 722. This type of coupling has its third opening terminating flush, with a side wall. Such a coupling permits the installation of sprinkler risers as is seen and will be discussed with respect to FIG. 12. Obviously, the sprinkler risers can be mounted on the inside of the lawn or outside of the lawn beyond the edging, depending upon the orientation of block 210 at time of installation.

FIG. 3 depicts a block 30, similar to that of FIG. 1, but of shorter extension. The unit of FIG. 1 is preferably about three feet long, whereas this one is about 1 root long. Here too, a nipple is seen to be inserted in each of the coupling openings 24 of said block. Suffice it to say that this block is similar to that of FIG. 1 but is only 1 foot long.

The unit 40 depicted in FIG. 4, instead of being straight, is cast in a curve at about a 4 foot radius, thereby permitting an 8 foot circle to be formed, or permitting the creation of rounded inside or outside corners in an assemblage as may be desired, according to the orientation chosen.

In FIG. 5, unit 50 is depicted. It is also a one foot unit, and has a tee fitting coupling 722 at one end. Note also the presence of exposed aggregate finish 28.

The block 60 of FIG. 6 has a construction similar to that of FIG. 13 as previously described, but rather than a straight elongated pipe 20, as employed in the FIG. 13 embodiment, a curved pipe section is employed, similar to the one employed in the FIG. 4 embodiment. This embodiment differs from that of FIG. 4 because it has 7.5 foot radius of curvature rendering it suitable for 15 foot diameter circles.

In FIG. 7, a relatively cubic unit 70 is shown. While units of this configuration can be utilized for mowing strips, we have found that they are more suitable for patio containment systems. Thus such a block can for example be sized as having an elevation of 5.5", an elongation of about 4.25" and a depth from front to back also of about 4.25". Here the conduit 718 is formed between two openings 24 of the single T coupling 722. The third opening of the tee is designated 25 and it is from this that water will be delivered to a riser, not shown. Typically fittings of a 1.25" size are employed with blocks having these dimensions. This is also true for the patio confinement blocks to be discussed in connection with FIGS. 8, 9 and 15.

Figure 8:
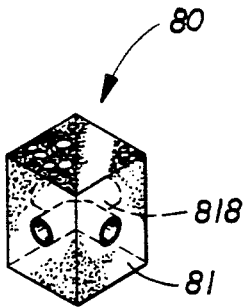
FIG. 8 is a top perspective view of a eighth construction block forming part of this invention.

The block 80 of FIG. 8 is unique in that it has a dual directional conduit, 818. Here the single coupling interred within the concrete 81 is a 1.25" slip fit cross, into which 4 nipples are to be inserted for connection of this block to 4 other blocks.

Skipping momentarily to the embodiment shown in FIG. 15, it is seen that this block 110 serves to form a right angle turn in the patio confinement system of this invention since its coupling 1522 is a 90 degree turn thus giving rise to a 90 degree conduit 1518.

Figure 9:
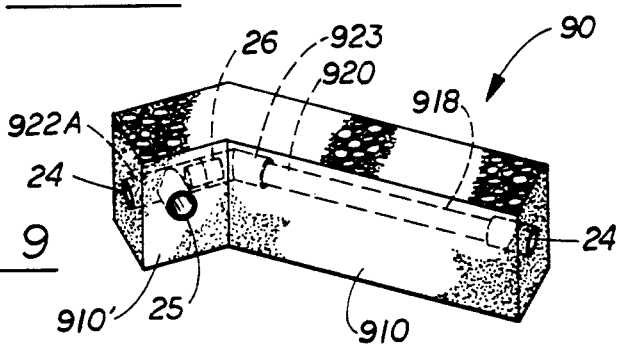
FIG. 9 is a top perspective view of a ninth construction block forming part of this invention.

The discussion now moves to the block of FIG. 9 which is used in the formation of triangles, as will be discussed in relative to FIG. 14. Here the block 90 is configured somewhat resembling a numeral 7. It has an elongated main section 910 from which emanates at one end integral oblique section 910'. Conduit 918 is formed from the connection of elongated internal pipe 920 to a 1.25" slip fit coupling 922 (adhered thereto, as are all the couplings using a suitable PVC cement) on one end, and a 45 degree elbow 923 at the other end of said pipe.

This 45 degree elbow may be slip fit or internally threaded, but what ever way it is, it must communicate to T 922A which may be either male threaded or slip fit. Of course, the threading on the elbow 923 and T 922A may be reversed. However, in order to reduce the inventory of parts needed to make the various embodiments of this invention, we prefer to use slip fit fittings everywhere. Thus element 923 is connected to 922A by a suitable nipple 26 as shown. As in FIG. 7, the outlet of the tee for the ultimate connection to a sprinkler riser is designated 25.

Assemblage Construction

Previously it has been indicated that an assemblage of a plurality of the blocks of this invention can be made via a connector means. This means comprises the use of a suitably sized nipple, which is covered on opposite ends with adhesive, inserted into the coupling and permitted to set.

If the plastic for the couplings and pipe section, if employed is PVC, then to avoid compatibility problems, the nipple should be also PVC. Of course other plastics such as ABS and chlorinated PVC, which is the abbbreviation for polyvinylchloride may be employed, and if so the nipple(s) should be of that same material and the adhesive suitably chosen. This is of course within the skill of the art.

Figure 10:
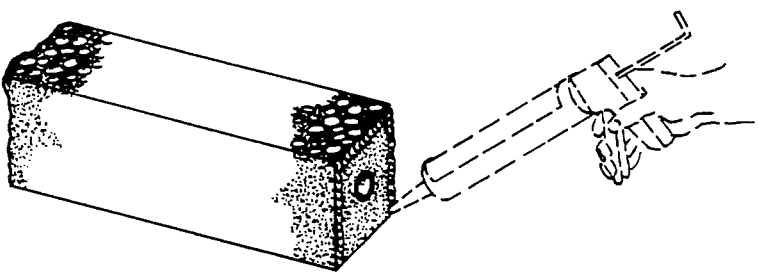
FIG. 10 is a diagrammatic view illustrating one step in the preparation of an assemblage according to this invention.
Figure 11:
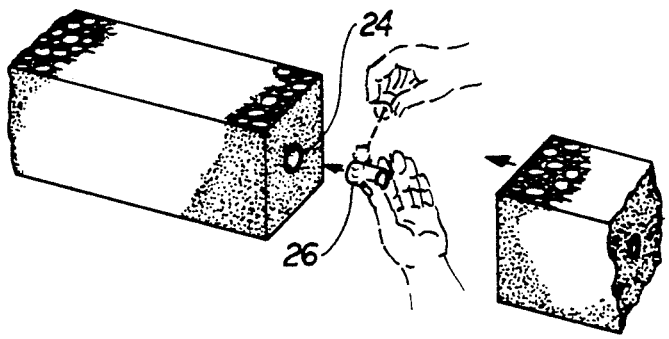
FIG. 11 is a diagrammatic view illustrating a second step in the preparation of an assemblage according to this invention.

In the construction of an assemblage according to this invention, be it lawn edging or a patio containment system, even though the blocks 10 et seq are rigidly retained in a fixed position by the adhered nipples 26, it is highly recommended that the procedure diagrammatically illustrated in FIG. 10 be carried out first. That is, one should use a caulk gun with a tube of concrete crack sealant to apply a bead of caulk around the periphery of the two facing ends 16 of a first block and 16' of a second block respectively. Then, proceeding to the diagram of FIG. 11, place suitable cement around the outside of both ends of the nipple. Slide the nipple in to the opening 24 of end 16' of first block; properly orient the second block; slide it onto the opposite end of the nipple which already has adhesive thereon; and bring the walls 16' and 16 into proximity to create an "Oreo" sandwich to thereby prevent grass and other plants from growing up between adjacent blocks.

It is seen therefore that any blocks that have only a conduit that opens on the ends with no access thereto from a side, can be secured one to another without the need for mortar. Even the caulking is optional.

However, when a self contained sprinkler system is desired, blocks such those shown in FIGS. 2, 5, 7, 9, and 15 must be employed. Reference is thus now made to FIG. 12 which illustrates an assemblage in construction. Shown left to right, beginning with the block segment are a block 10, a block 210 and a block 30. Block 10 is shown attached to block 210 by the nipple 26 and shown depending from sprinkler T opening 25 is a short pipe 19, which is shown adhesively or threadedly engaged to elbow 21. Disposed within elbow 21 is a riser 23, usually of ½ or ¾ inch diameter for lawn edging, upon which is threadedly engaged a sprinkler head 27 of any of the common types available from various manufacturers. Other sprinkler connections would be made the same way. Water to supply the sprinkler system would enter into the conduit via another of these sprinkler T openings 25 from a water source, usually PVC pipe running to manual or automatic sprinkler controllers as is well known in the lawn care art.

FIG. 14 has been included to illustrate from a top plan view a typical patio containment system based on the larger blocks of this invention, which as have been noted have an elevation of about 5.5 inches and a depth of about 4.25 inches. Length is a matter of choice, though we have found 1 foot and three feet to be a quite suitable combination to achieve any configuration one may desire. Shown set out between the four blocks 10 of 3 feet in length, are a series of conventional paver blocks 29 of similar elevation. They need not be mortared in place to achieve a permanent patio, since movement is prevented by the fixedly secured blocks 10 of this invention. Needless to say, the pattern illustrated is exemplary only and any pattern may be employed within the confines of the 4 blocks 10. Also illustrated here are several other blocks of this invention that have been utilized in this assemblage; namely blocks 70, 80, and 90. See the noted circles on the drawing.

The conduit 18 has been noted previously as being useful for the delivery of water for a sprinkler system and indeed such has been illustrated. This conduit, which lies along the central axis of its block can however be used with equal facility for the delivery of low voltage wire to a lightscaping system. The low voltage lights such as those sold by Malibu and others would be wired through from block to block and then through the sprinkler openings 25 at the appropriate locations. It is believed that it will be easier to pull the wire along as each new block is secured to a previous block rather than to try to snake wires back to a source opening 25 for the low voltage power.

FIG. 16 is an elevational view of one end of a block 1610. The end is designated 160. As can be seen the finish on the top surface is smooth, 17 as opposed to exposed aggregate 28. Here a pair of spaced conduits 25A and 25B are shown. One of these can be used for water and the other can be used for the low voltage lighting aforesaid. It may also be beneficial to raise the elevation to accommodate to vertically spaced conduits, or to make the block 1610 deeper to accommodate two horizontally spaced conduits (not shown, but contemplated.) The same size block as used in the smaller lawn edge blocks namely xx high, X yy deep of varying lengths may be employed if the pipe, assuming it is present, and the couplings employed are ½ or ¾ inch.

Since there is no criticality to the height, width and depth of the blocks of this invention, it is within the skill of the art to carry out any necessary sizing to achieve the desired results.

While the thrust of the discussion has been about the use of concrete for the blocks of this invention, other suitable materials include light concrete and adobe, all of which can be cast into modules with the conduit down the middle, and terminating flush on the ends of the block. The pipe employed herein is imperforate, other than at the ends where it communicates with the couplings. As has been seen, each coupling has at least two openings in communication with each other, which may or not be linear as has been noted.

It is seen in conclusion that we have disclosed a landscaping system for patio confinement and lawn edging that eliminates the use of bender board to form flower beds, significantly cuts labor time and cost, permits water to be brought easily to desired locations, and eliminates the need for masonry skills for proper installation.

While it is generally contemplated that if the conduit includes an elongated pipe length, the pipe will run down the central axis of the longer direction of the block, it is also contemplated to prepare blocks that have a very short conduit therein, running normal to the length of the block. Such block would have limited specific uses.

Since certain changes may be made in the above device without departing from the scope of the invention herein involved, it is intended that all matter contained in the above description and shown in the accompanying drawings shall be interpreted as illustrative and not in a limiting sense.

We claim:

1. A garden edging section formed as a precast elongated module and used for the preparation of an assemblage of a plurality of such sections without the use of mortar,
   each section having a top wall, a bottom wall, two side walls and two end walls,
   each section comprising at least one conduit therein, each such conduit being formed from an imperforate plastic pipe length in fluid communication, with
   a double ended female coupling connected at both opposite ends of said pipe length,
   said conduit being open at its extremity and said couplings terminating flush with the respective end wall of said section,
   whereby a piece of plastic pipe can be used to effect such connections to form the assemblage.

2. The garden edging section of claim 1 wherein the pipe length if present, is arcuate.

3. The garden edging section of claim 1 wherein the at least one conduit comprises a single conduit having female pipe couplings at each end.

4. The garden edging section of claim 1 wherein there are a pair of spaced conduits running the length of the block and being open at their termination flush with the end walls thereof.

5. An assemblage formed from a plurality of the elongated section of claim 1 wherein connection of adjacent sections one to another to form the assemblage is carried out by connector means comprising the interposition and adhesion of pipe lengths within adjacent female couplings.

6. The assemblage of claim 5 wherein a concrete caulk sealant has been applied between any two spaced blocks to retard growth of grass and weeds.

7. The garden edging section as in claim 1 wherein said conduit extends in two directions through the section; namely, end to end, and out one side wall.

8. The garden edging section of claim 7 wherein one of the couplings is cross shaped and the conduit extends end to end and out said side walls.

9. A garden edging section formed as a precast elongated module for the preparation of an assemblage from a plurality of such section, each having a top, bottom, two side walls and two end walls,
   each of which sections includes at least one conduit there through, said conduit being formed from an elongated imperforate plastic pipe length connected in fluid communication with, double ended female plastic pipe couplings present at the opposite ends thereof, said conduit terminating flush with the end walls of said section and being open on its ends.

10. The garden edging section as in claim 9 wherein one of said female pipe couplings is T-shaped, and having three openings, and the third opening of said one coupling terminates flush with a side wall of said section and is open.

11. The garden edging section of claim 9 wherein the pipe length is arcuate.

12. The garden edging section of claim 9 wherein the pipe length is arcuate and one of said female couplings is T-shaped and has three openings and the third opening of said one coupling terminates flush with a side wall of said block and is open.

13. The garden edging section of claim 9 wherein there are a pair of spaced conduits running the length of the block each being open at their termination flush with the end walls thereof.

14. The garden edging section formed as a precast elongated module for the preparation of an assemblage from a plurality of such sections, each section having a top wall, bottom wall, two side walls and two end walls,
    each of which sections includes a conduit there through, said conduit being formed from an elongated imperforate plastic pipe length connected in fluid communication with, double ended female plastic pipe couplings present at the opposite ends thereof, said conduit being disposed along the central axis of the longest dimension of the section, said conduit terminating flush with the end walls of said section and being open on its ends.

15. The garden edging section of claim 14 wherein the pipe length is arcuate.

16. The garden edging section of claim 14 wherein the top wall is finished with an exposed aggregate surface.

17. The garden edging section of claim 14 wherein one of the couplings of said conduit is T-shaped, and has three openings, and the third opening of said tee terminates flush with a side wall of said section.

18. The assemblage formed from a plurality of the sections of claim 14 without mortar wherein connection of adjacent blocks one to another to form the assemblage is carried out by connector means comprising the interposition and adhesion of male plastic nipples within adjacent female couplings.

19. An assemblage of garden edging sections, each of which sections is formed of precast concrete having at least one conduit therein, said assemblage being formed without mortar, wherein each section comprises an elongated module having a top wall, a bottom wall, two side walls and two end walls, and wherein each conduit present comprises a pair of double ended female plastic couplings fluidly connected to a plastic pipe length therebetween, each said coupling terminating flush with the end wall of said section,
    the connection of one module to the next being a plastic pipe length inserted into each of a pair of opposed couplings.

20. In the assemblage of claim 19 wherein a caulk layer is interposed between the end walls of adjacent sections.

21. The assemblage of claim 20 wherein the top wall of each section is finished with an exposed aggregate surface.

* * * * *